(12) United States Patent
Wirtanen et al.

(10) Patent No.: US 9,730,147 B2
(45) Date of Patent: Aug. 8, 2017

(54) HIGHER PRIORITY NETWORK SCANNING

(71) Applicant: BLACKBERRY LIMITED, Waterloo (CA)

(72) Inventors: Jeffrey William Wirtanen, Ottawa (CA); Muhammad Khaledul Islam, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 466 days.

(21) Appl. No.: 14/023,646

(22) Filed: Sep. 11, 2013

(65) Prior Publication Data
US 2015/0072679 A1 Mar. 12, 2015

(51) Int. Cl.
*H04W 48/16* (2009.01)
*H04W 48/18* (2009.01)

(52) U.S. Cl.
CPC ........... *H04W 48/16* (2013.01); *H04W 48/18* (2013.01)

(58) Field of Classification Search
CPC .............................. H04W 48/18; H04W 48/16
USPC ... 455/434, 436, 435.3, 432.1, 435.1, 161.2, 455/18–20; 370/328, 312
See application file for complete search history.

(56) References Cited

U.S. PATENT DOCUMENTS

| | | | |
|---|---|---|---|
| 7,519,365 B2 | 4/2009 | Dorsey | |
| 2004/0114689 A1* | 6/2004 | Zhang | H04N 19/70 375/240.16 |
| 2004/0224689 A1* | 11/2004 | Raghuram | H04W 48/16 455/435.3 |
| 2005/0037755 A1* | 2/2005 | Hind | H04W 48/18 455/435.3 |
| 2006/0264215 A1 | 11/2006 | Ekstedt et al. | |
| 2008/0182615 A1* | 7/2008 | Xue | H04W 48/16 455/552.1 |
| 2009/0238117 A1* | 9/2009 | Somasundaram | H04J 11/0093 370/328 |
| 2009/0323609 A1* | 12/2009 | Walton | H04W 48/16 370/329 |
| 2010/0227641 A1* | 9/2010 | Muller | H04W 88/06 455/552.1 |
| 2010/0279637 A1* | 11/2010 | Umatt | 455/161.2 |
| 2012/0083268 A1* | 4/2012 | Lung | H04W 48/16 455/434 |
| 2012/0302241 A1* | 11/2012 | Klingenbrunn | H04W 48/16 455/436 |
| 2012/0309391 A1* | 12/2012 | Zhang | H04W 48/16 455/432.1 |
| 2012/0322446 A1* | 12/2012 | Ramachandran | H04W 48/18 455/436 |

(Continued)

FOREIGN PATENT DOCUMENTS

| | | |
|---|---|---|
| CN | 101584239 | 11/2009 |
| CN | 101707783 | 5/2010 |

(Continued)

OTHER PUBLICATIONS

European Patent Office, Extended European Search Report for EP Application No. 14183177.6 dated Apr. 4, 2015 (8 pages).

(Continued)

*Primary Examiner* — Kamran Afshar
*Assistant Examiner* — Farideh Madani
(74) *Attorney, Agent, or Firm* — Trop Pruner & Hu, P.C.

(57) ABSTRACT

A user equipment (UE) determines whether the UE is camped on a highest priority network. The UE being configured to scan for a higher priority network even though the UE is already camped on the highest priority network as specified in a network selector data structure that identifies networks and that indicates respective priorities of the identified networks. In response to determining that the UE is camped on the highest priority network, the UE stops scanning for a higher priority network.

19 Claims, 2 Drawing Sheets

(56) References Cited

U.S. PATENT DOCUMENTS

| | | | | |
|---|---|---|---|---|
| 2013/0109377 A1* | 5/2013 | Al-Khudairi | ......... | H04W 48/16 455/432.1 |
| 2013/0258934 A1* | 10/2013 | Amerga | ............... | H04W 48/20 370/312 |
| 2014/0086177 A1* | 3/2014 | Adjakple | ............. | H04W 12/08 370/329 |
| 2014/0155061 A1* | 6/2014 | Kherani | ................ | H04W 48/16 455/434 |
| 2015/0056985 A1* | 2/2015 | Swaminathan | ....... | H04W 88/06 455/432.1 |

FOREIGN PATENT DOCUMENTS

| | | |
|---|---|---|
| WO | WO2012145207 A1 | 10/2012 |
| WO | WO2013025715 A1 | 2/2013 |

OTHER PUBLICATIONS

Ericsson: "Discussion paper on Network Selection principles," 3GPP Draft; S1-050956-NSP-Discussion-Paper, TSG-SA WG1 #30, Oct. 2005 (14 pages).

3GPP TS 22.011 V3.8.0; 3rd Generation Partnership Project; Technical Specification Group Services and System Aspects; "Service Accessibility"; Release 1999; Sep. 2002; 14 pages.

3GPP TR 22.811 V7.2.0; 3rd Generation Partnership Project; Technical Specification Group Services and System Aspects;"Review of Network Selection Principles"; Release 7; Jun. 2006; 15 pages.

3GPP TSG-CN Meeting #23; Tdoc NP-040129; Source: CN1 Chairman on Behalf of Drafting Group; "Some Considerations on the Use of RaT in PLMN Selection"; Agenda item: 6.1.2; For discussion; Phoenix, Arizona, Mar. 10-12, 2004; 9 pages.

3GPP TS 23.122 V12.1.0; 3rd Generation Partnership Project; Technical Specification Group Core Network and Terminals; "Non-Access-Stratum (NAS) functions related to Mobile Station (MS) in Idle Mode"; Release 12; Jun. 2013; 45 pages.

3GPP TS 25.304 V11.3.0; 3rd Generation Partnership Project; Technical Specification Group Radio Access Network; "User Equipment (UE) Procedures in Idle Mode and Procedures for Cell Reselection in Connected Mode"; Release 11; Jun. 2013; 53 pages.

3GPP TS 36.304 V11.3.0; 3rd Generation Partnership Project; Technical Specification Group Radio Access Network; Evolved Universal Terrestrial Radio Access (E-UTRA); "User Equipment (UE) Procedures in Idle Mode"; Release 11; Mar. 2013; 34 pages.

* cited by examiner

HIGHER PRIORITY NETWORK SCANNING

BACKGROUND

A user equipment (UE) is able to wirelessly connect to a mobile communications network to perform communications. A mobile communications network is made up of cells that correspond to respective regions in which UEs are able to establish wireless connections with the mobile communications network.

Different mobile communications networks can be maintained and managed by different network providers. UEs associated with subscribers of a given network operator are able to access the mobile communications network of the given network operator.

Network operators can also enter into agreements that allow UEs of subscribers of a first network operator to access the mobile communications network of a second network operator. When a UE is in the coverage area of a mobile communications network ("home network") to which the UE is subscribed, the UE can access its home network. When the subscriber travels to a location that is outside the coverage area of the UE's home network, the UE can access a visited (or foreign) mobile communications network to obtain service provided for the UE's subscription by a roaming agreement between the home network operator and the operator of visited network. A UE accessing a visited network is considered a roaming UE.

BRIEF DESCRIPTION OF THE DRAWINGS

Some embodiments are described with respect to the following figures.

DETAILED DESCRIPTION

Figure 1:
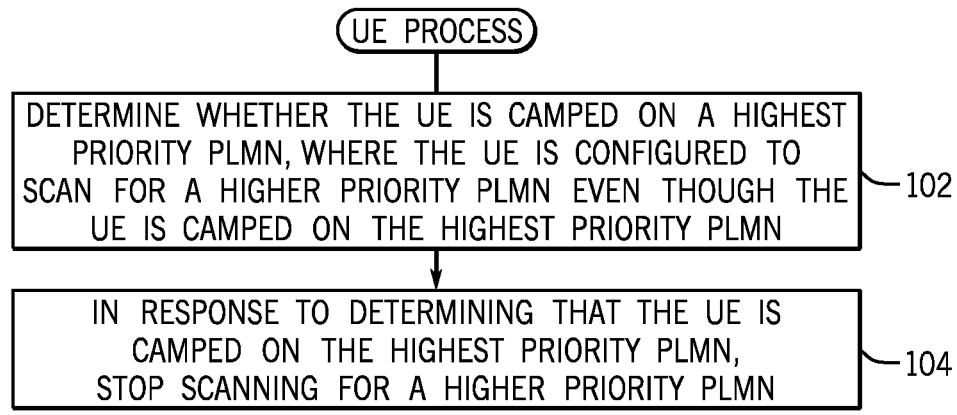
FIG. 1 is a flow diagram of a network scan process according to some implementations.

When a user equipment (UE) enters a coverage area of a mobile communications network, the UE can perform a registration process to register with the mobile communications network. Examples of UEs include any or some combination of the following: telephone handsets, personal digital assistants (PDAs), tablet computers, notebook computers, game appliances, or other types of electronic devices that are capable of performing wireless communications.

A UE can select a cell (from among multiple cells) of the mobile communications network and then register with the mobile communications network. A UE being camped on a cell of a network refers to the UE having selected the cell (possibly from among multiple candidate cells) to monitor for information that enables the UE to establish a wireless connection with the cell.

In some implementations, a network that is provided by a network operator can be referred to as a public land mobile network (PLMN). A PLMN can be identified by a mobile country code (MCC) and a mobile network code (MNC).

In the ensuing discussion, reference is made to PLMNs. However, it is noted that techniques or mechanisms according to some implementations can be applied to other types of networks that are provided by a network operator. More generally, a network or mobile communications network can refer to any defined arrangement of network nodes that UEs can wirelessly access for the purpose of performing communications with other endpoints, which can include wireless endpoints or wired endpoints. Different networks can be provided by respective different network operators.

When the UE is camped on a PLMN that is not the home PLMN or the highest priority PLMN in a visited country, the UE can perform a network scan to try to find its home PLMN or a higher priority visited PLMN. The UE being camped on a PLMN refers to the UE having selected a cell in the PLMN and having successfully registered with the PLMN. The network scan performed by the UE can be repeated at specified time intervals, which can be defined by standards governing operations in a mobile communications network. Examples of standards include standards according to the Third Generation Partnership Project (3GPP), or other types of standards.

The time interval between network scans for a higher priority PLMN can be configured (by a home network operator) on a User Identity Module in a UE. An example of a User Identity Module is a universal subscriber identity module (USIM). In addition, a prioritized PLMN selector list of all foreign PLMNs with whom the home network provider may have roaming agreements can also be configured on the USIM. In addition, multiple PLMNs can be configured by the home network provider to be considered by a UE as an "equivalent" home PLMN. The term home PLMN is used in this disclosure to include an equivalent home PLMN as well.

If the UE detects a higher priority PLMN during a network scan, the UE can register with the higher priority PLMN to access the resources of the higher priority PLMN. If available, the home PLMN is the highest priority PLMN. A goal of performing network scanning when the UE is in a visited PLMN is to allow the UE to return to its home PLMN as quickly as possible, to avoid any roaming charges that may be imposed.

Current standards, such as the 3GPP standards (more specifically, 3GPP TS 23.122), specify that when a UE is registered with a visited PLMN, which is referred to as the registered PLMN, the UE is to perform a network scan for higher priority PLMNs if there are PLMNs configured on the USIM that have the same MCC (or range of MCCs) as the registered PLMN but which have higher priority. As a result, the UE in a visited PLMN may have to scan for a higher priority PLMN in the same country (or group of countries) that is associated with the registered PLMN.

However, certain network operators can configure a UE to violate the foregoing specification. The network scanning configuration of a UE can be provided in the USIM of the UE. In other examples, the network scanning configuration of the UE can be provided using a different mechanism. In an example, even though the UE is currently registered with the highest priority PLMN in a visited country (different from the country of the home network) and obtains all its subscribed services from the visited PLMN, the UE can have a configuration that causes the UE to continue to scan for a higher priority PLMN, including its home PLMN, that may have an MCC that is different from the MCC (or range of MCCs) associated with the registered PLMN. For example, while the UE of subscriber of a United States network operator is in a visited PLMN in Canada (which can even be the highest priority Canadian PLMN according to the USIM configuration), the UE may be configured by the United States home network operator to continue to perform a higher priority PLMN scan to attempt to get back to the UE's home PLMN in the United States even though the UE may be far away from the border between the United States and Canada.

Continuing to scan for a higher priority PLMN in the foregoing scenario, when the UE is already registered with a highest priority visited PLMN, can be wasteful of the battery power of the UE.

In accordance with some implementations, a network scanning control mechanism is provided to cause the UE to stop scanning for a higher priority PLMN under certain conditions. This may avoid some of the power consumption of a UE when the UE is camped on a visited PLMN as explained above. FIG. 1 is a flow diagram of a network scanning process that can be performed by the UE, according to some implementations. In the ensuing discussion, it is assumed that the UE is provided with a configuration (e.g. in the UE's USIM or in another component) that causes the UE to continue to scan for a higher priority PLMN, including the UE's home PLMN in a different country, even though the UE is already camped on the highest priority visited PLMN in the area (e.g. as defined by an MCC or range of MCCs) in which the UE is currently located.

The network scanning process of FIG. 1 determines (at 102) whether the UE is camped on a highest priority PLMN associated with the same MCC (or range of MCCs) as the registered PLMN. In some implementations, the highest priority PLMN can be determined from a PLMN selector list (more generally referred to as a "network selector list" or other data structure stored by the UE). The PLMN selector list identifies PLMNs and respective priorities of the identified PLMNs. In some examples, the priorities of the PLMNs in the PLMN selector list may be implicitly indicated from an order of the PLMNs in the selector list. In other examples, the priorities of the PLMNs in the PLMN selector list may be explicitly indicated. The highest priority PLMN determined (at 102) is the highest priority PLMN (indicated in the PLMN selector list) that is associated with the same MCC (or range of MCCs) as the registered PLMN. In response to determining that the UE is camped on the highest priority PLMN, the network scanning process stops (at 104) the UE from scanning for a higher priority PLMN, even though the UE has a configuration (such as specified by its USIM) that configures the UE to scan for a higher priority PLMN despite the UE being camped on the highest priority PLMN.

The stopping of the scanning for the higher priority PLMN (performed at 104) is a behavior that overrides the network scanning configuration of the UE.

Figure 2:
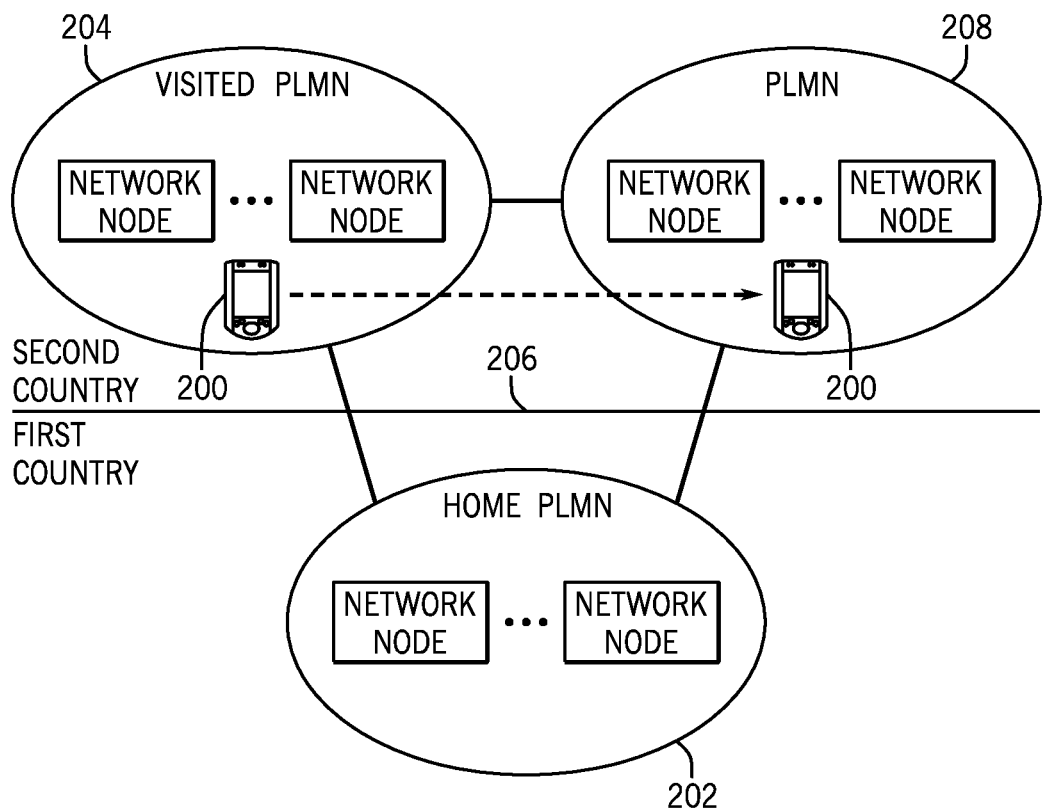
FIG. 2 is a block diagram of an example network arrangement according to some implementations.

FIG. 2 illustrates an example in which a UE 200, which is associated with a home PLMN 202, has roamed to a visited PLMN 204. In the example of FIG. 2, it is assumed that the home PLMN 202 is in a first country, while the visited PLMN 204 is in a second country. The first and second countries are separated by a border 206. FIG. 2 also shows another PLMN 208 that is in the second country. It is assumed that the first country will have a different MCC or range of MCCs than the second country.

Each PLMN 202, 204, or 208 includes an arrangement of network nodes, including wireless access network nodes and core network nodes, with which a UE can interact for performing communications in the respective PLMN. A wireless access network node of a PLMN communicates wirelessly with a UE. The wireless access network nodes are coupled to core network nodes, which can perform various specified tasks.

The network nodes of a PLMN can operate according to one or more radio access technologies. Examples of radio access technologies include a Universal Mobile Telecommunications System (UMTS) technology, as provided by 3GPP. The UMTS technology is also referred to as the Universal Terrestrial Radio Access (UTRA) technology. Another type of radio access technology is the Long Term Evolution (LTE) technology, which is also referred to as the Evolved Universal Terrestrial Radio Access (E-UTRA) technology.

Although specific radio access technologies are discussed, it is noted that techniques or mechanisms according to some implementations can be applied with other types of radio access technologies.

Network nodes that operate according to the UTRA technology include radio network controllers (RNCs) and NodeBs (NBs). An RNC carries out radio resource management and certain mobility management tasks. An RNC can control one or more NodeBs. A NodeB is a base transceiver station that is able to wirelessly transmit and receive signals to and from a UE.

Network nodes according to the E-UTRA technology can include enhanced NodeBs (eNBs). An eNB can include functionalities of the RNC and NodeB.

If the visited PLMN 204 that the roaming UE 200 of FIG. 2 is currently camped on is not a highest priority PLMN, the UE 200 can continue to scan for a higher priority PLMN that has the same MCC (or range of MCCs) associated with the visited PLMN 204. As noted above, the visited PLMN 204 to which the UE 200 is currently camped is also referred to as a registered PLMN.

In the example of FIG. 2, it is assumed that the PLMN 208 is the highest priority PLMN, based on the PLMN selector list of the UE 200. In response to performing network scanning for higher priority PLMNs, the UE 200 can detect the PLMN 208, which can occur when the UE 200 has moved to a location that is near the border between the PLMNs 204 and 208. When the UE 200 detects the higher priority PLMN 208 in its network scan, the UE 200 sends a request to register with the higher priority PLMN 208. Once the registration procedure has successfully completed, the UE 200 can camp on the higher priority PLMN 208, which becomes the current registered PLMN.

According to the process of FIG. 1, since the UE 200 is now camped on the highest priority PLMN 208 in the second country (e.g. the highest priority PLMN indicated in a PLMN selector list with the same MCC (or range of MCCs) as the registered PLMN), the UE 200 can stop scanning for a higher priority PLMN, even though the UE has a configuration that causes the UE to continue to scan for a higher priority PLMN despite the UE being camped on the highest priority PLMN (indicated in the PLMN selector list with the same MCC (or range of MCCs) as the registered PLMN.

Should the UE 200 later move back to the coverage area of the home PLMN 202, the UE 200 may move out of the coverage areas of the PLMNs 204 and 208. At this point, the UE 200 is no longer able to access the PLMNs 204 and 208. As a result, the UE 200 is triggered to detect an available PLMN, which now is the home PLMN 202. The UE 200 then registers with the home PLMN 202 and camps on a cell of the home PLMN 202.

In some cases, a PLMN can include multiple portions that operate according to different radio access technologies, e.g. the UTRA technology, the E-UTRA technology, or another radio access technology. For example, the PLMN can include a first portion including an arrangement of network nodes that operate according to the UTRA technology, and a second portion including a second arrangement of network nodes that operate according to the E-UTRA technology.

The first and second arrangements of network nodes may provide respective coverage areas that overlap or that do not overlap.

A visited PLMN may allow a roaming UE, such as the UE 200 in FIG. 2, to access the UTRA portion of the visited PLMN, but may prevent the roaming UE from accessing the E-UTRA portion of the visited PLMN. When the roaming UE attempts to register with the E-UTRA portion of the visited PLMN, the visited PLMN can send a registration rejection message (or some other rejection indication) back to the roaming UE. In some cases, even though the roaming UE has been denied access to the E-UTRA portion of the visited PLMN, the roaming UE may continue to scan for the E-UTRA portion of the visited PLMN. Such scanning can also be wasteful of the battery resource of the roaming UE.

Figure 3:
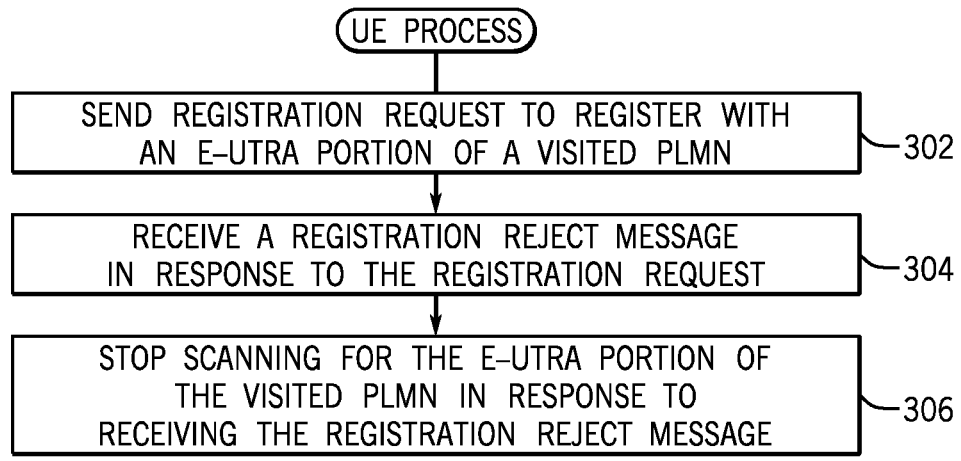
FIG. 3 is a flow diagram of a network scan process according to further implementations.

In accordance with some implementations, once the roaming UE receives a registration rejection indication in response to a registration attempt by the roaming UE of the E-UTRA portion of the visited PLMN, the roaming UE can stop scanning for the E-UTRA portion of the visited PLMN. FIG. 3 is a flow diagram of a network scanning process of a roaming UE according to some implementations. It is assumed that the UE has already registered with and is currently camped on the UTRA portion or any non-E-UTRA portion of the visited PLMN.

Upon detecting presence of the E-UTRA portion of the visited PLMN in a network scan performed by the UE, the UE sends (at 302) a registration request to register with an E-UTRA portion of the visited PLMN. The UE receives (at 304) a registration reject message (or other rejection indication) that is responsive to the registration request. The registration reject message can contain a specific cause code that indicates that there are no suitable cells in a specific area for the registration request.

In response to receiving the registration reject message, or some other rejection indication, the UE stops (at 306) scanning for the E-UTRA portion of the visited PLMN.

In alternative implementations, instead of stopping the scanning for the E-UTRA portion of the visited PLMN altogether in response to receiving the registration reject message, the UE can identify at least one frequency of the E-UTRA portion of the visited PLMN for which the rejection message was received. In such implementations, the UE stops scanning for the E-UTRA portion of the visited PLMN at the identified at least one frequency. However, the UE can continue to scan for an E-UTRA portion that operates according to a frequency that is different from the identified at least one frequency.

In further implementations, the UE can continue to scan for an E-UTRA portion at one or more frequencies that have been identified by the UE or configured on the UE as home network E-UTRA frequencies.

Alternatively, the UE may decide to stop scanning for the E-UTRA portion after receiving a number (greater than one) of reject messages.

Moreover, the UE can resume scanning for the E-UTRAN portion after the UE detects a change in PLMN or some other network identifier.

In some cases, a configuration at the UE that causes the UE to continue to scan for a higher priority PLMN, including the UE's home PLMN in a different country, even though the UE is already camped on the highest priority visited PLMN, can be a configuration that specifies that the UE is to scan for just one or more specific radio access technologies (RATs) of the home PLMN. For example, if the home network has UTRA RAT deployed throughout its service coverage area, but E-UTRA deployment is included in only certain geographical regions which also fall within the coverage of the UTRA RAT, then the PLMN scanning by the UE for a higher priority PLMN can be performed to just the UTRA portion of the home network.

Figure 4:
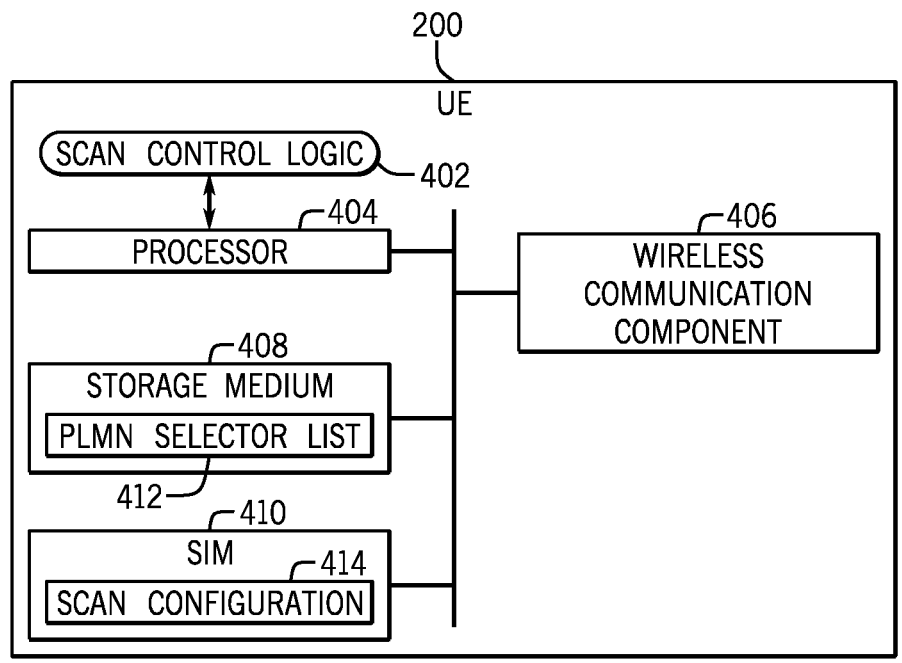
FIG. 4 is a block diagram of an example user equipment according to some implementations.

FIG. 4 is a block diagram of an example UE, such as the UE 200 of FIG. 2. The UE 200 includes scan control logic 402, which can perform the tasks discussed above, including those depicted in FIGS. 1 and 3. In some examples, the scan control logic 402 is implemented as machine-readable instructions that are executed on one or multiple processors 404 of the UE 200. In different examples, the scan control logic 402 can be implemented as hardware control logic. A processor can include a microprocessor, microcontroller, processor module or subsystem, programmable integrated circuit, programmable gate array, or another control or computing device.

The scan control logic 402 can be part of one or more protocol layers (not shown) of the UE 200. These protocol layers can include an access stratum (AS) layer and a non-access stratum (NAS) layer. The AS layer is responsible for transporting data over a wireless connection between the UE 200 and a wireless access network node. An NAS layer is used for managing the establishment of communication sessions and for maintaining communication sessions between the UE 200 and the wireless access network node. Examples of tasks of the NAS layer include mobility management, session management, and identity management.

The scan control logic 402 can be included in one or both of the AS layer and NAS layer, or in some other layer of the UE 200.

The processor(s) 404 can be coupled to various other modules, including a wireless communication component 406, a storage medium (or storage media) 408, and a SIM 410 (e.g. USIM). The wireless communication component 406 is able to perform wireless communications with a wireless access network node. The storage medium (or storage media) 408 can store various information and instructions. In the example of FIG. 4, a PLMN selector list 412 is stored in the storage medium 408. The PLMN selector list identifies PLMNs that are to be scanned by the scan control logic 402 for finding a higher priority PLMN, assuming that the UE is not already camped on the highest priority PLMN. The PLMN selector list 412 can be built from information contained in the SIM 410, in some examples. The SIM 410 can indicate which PLMNs are at higher priorities than other PLMNs. The indications of such priorities of the PLMNs can be provided by the PLMN selector list 412. If applicable, the SIM 410 can also include information relating to an equivalent home PLMN.

The SIM 410 includes memory that can store information relating to a scan configuration 414. As discussed above, the scan configuration 414, which can be set by the network operator of the home PLMN of the UE 200, can configure the UE 200 to scan for a higher priority PLMN, including the home PLMN, even though the UE is already camped on the highest priority visited PLMN. However, as discussed above, this scan configuration 414 can be overridden using techniques or mechanisms according to some implementations.

The storage medium or storage media 408 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    determining, by a user equipment (UE), whether the UE is camped on a highest priority network as specified in a network selector data structure that identifies public land mobile networks (PLMNs) and that indicates respective priorities of the identified PLMNs, the UE being configured to scan for a higher priority PLMN even though the UE is already camped on the highest priority PLMN, where the higher priority PLMN has a mobile country code (MCC) different from an MCC associated with the highest priority PLMN or is outside a range of MCCs associated with the highest priority PLMN;
    in response to determining that the UE is camped on the highest priority PLMN, stopping, by the UE, scanning for a higher priority PLMN, wherein a given PLMN that the UE is currently camped on includes a plurality of network portions that operate according to respective different radio access technologies;
    receiving, by the UE, one or more rejection indications from the given PLMN in response to attempting one or more registrations with a first of the network portions that operates according to a first of the radio access technologies; and
    in response to receiving the one or more rejection indications from the given PLMN, stopping, by the UE, a scan for the first network portion.

2. The method of claim 1, further comprising:
    in response to determining that the UE is not camped on a highest priority PLMN, scanning, by the UE, for a higher priority PLMN.

3. The method of claim 1, wherein determining whether the UE is camped on the highest priority PLMN comprises determining whether the UE is camped on the highest priority PLMN, specified in the PLMN selector data structure, that is associated with the same MCC (or range of MCCs) as a registered PLMN.

4. The method of claim 1, wherein the UE has a configuration that causes the UE to scan for a higher priority PLMN even though the UE is already camped on the highest priority PLMN, responsive to a condition where the highest priority PLMN is not a home PLMN of the UE.

5. The method of claim 4, wherein the configuration specifies that the UE is to scan for just one or more radio access technologies (RATs) of the home PLMN.

6. The method of claim 4, wherein the UE includes a subscriber identity module that includes the configuration.

7. The method of claim 6, wherein stopping the scanning overrides the configuration of the subscriber identity module.

8. The method of claim 1, wherein the first radio access technology is an Evolved Universal Terrestrial Radio Access (E-UTRA) technology.

9. The method of claim 1, further comprising:
    resuming scanning for a network portion that operates according to the first radio access technology in response to the UE detecting a change in a PLMN that the UE is camped on.

10. The method of claim 1, further comprising:
    identifying at least one frequency of the first network portion, wherein stopping the scan for the first network portion in response to receiving the one or more rejection indications from the given PLMN comprises stopping, by the UE, the scan for the first network portion that operates according to the first radio access technology at the identified at least one frequency.

11. The method of claim 10, further comprising continuing to scan for a network portion that operates according to the first radio access technology at a frequency used for the first radio access technology in a home PLMN of the UE.

12. The method of claim 1, wherein stopping the scan for the first network portion is in response to receiving a predetermined number of the rejection messages from the given PLMN, the predetermined number greater than one.

13. A user equipment (UE) comprising:
    a memory to store information relating to a configuration for configuring the UE to scan for a higher priority public land mobile network (PLMN) even though the UE is already camped on a highest priority PLMN, where the higher priority PLMN has a mobile country code (MCC) different from an MCC associated with the highest priority PLMN or is outside a range of MCCs associated with the highest priority PLMN; and
    at least one processor configured to:
        detect that the UE is camped on the highest priority PLMN as specified in a network selector data structure that identifies PLMNs and that indicates respective priorities of the identified PLMNs;
        in response to determining that the UE is camped on the highest priority PLMN, override the configuration by stopping a scan for a higher priority PLMN, wherein a given PLMN that the UE is currently camped on includes a plurality of network portions that operate according to respective different radio access technologies;
        receive one or more rejection indications from the given PLMN in response to attempting one or more registrations with a first of the network portions that operates according to a first of the radio access technologies; and
        in response to receiving the one or more rejection indications from the given PLMN, stop scanning for the first network portion.

14. The UE of claim 13, wherein the configuration is for configuring the UE to scan for a home PLMN of the UE that is outside the MCC or range of MCCs associated with a highest priority visited PLMN.

15. The UE of claim 13, wherein the at least one processor is configured to:

identify at least one frequency of the first network portion, wherein the stopping of the scanning for the first network portion in response to receiving the one or more rejection indications from the given PLMN comprises stopping scanning for the first network portion that operates according to the first radio access technology at the identified at least one frequency.

16. The UE of claim 13, wherein the memory is part of a subscriber identity module of the UE.

17. The UE of claim 13, wherein stopping scanning for the first network portion is in response to receiving a predetermined number of the rejection messages from the given PLMN, the predetermined number greater than one.

18. An article comprising at least one non-transitory machine-readable storage medium storing instructions that upon execution cause a user equipment (UE) to:

determine whether the UE is camped on a highest priority public land mobile network (PLMN) as specified in a PLMN selector data structure that identifies PLMNs and that indicates respective priorities of the identified PLMNs, the UE being configured by a network scanning configuration to scan for a higher priority PLMN even though the UE is already camped on the highest priority PLMN, where the higher priority PLMN has a mobile country code (MCC) different from an MCC associated with the highest priority PLMN or is outside a range of MCCs associated with the highest priority PLMN;

in response to determining that the UE is camped on the highest priority PLMN, stop, by the UE, scanning for a higher priority PLMN to override the network scanning configuration of the UE, wherein a given PLMN that the UE is currently camped on includes a plurality of network portions that operate according to respective different radio access technologies;

receive one or more rejection indications from the given PLMN in response to attempting one or more registrations with a first of the network portions that operates according to a first of the radio access technologies; and in response to receiving the one or more rejection indications from the given PLMN, stop scanning for the first network portion.

19. The article of claim 18, wherein stopping scanning for the first network portion is in response to receiving a predetermined number of the rejection messages from the given PLMN, the predetermined number greater than one.

* * * * *